Sept. 24, 1963     W. M. GRESSARD     3,104,486
FISH LURE
Filed July 1, 1960
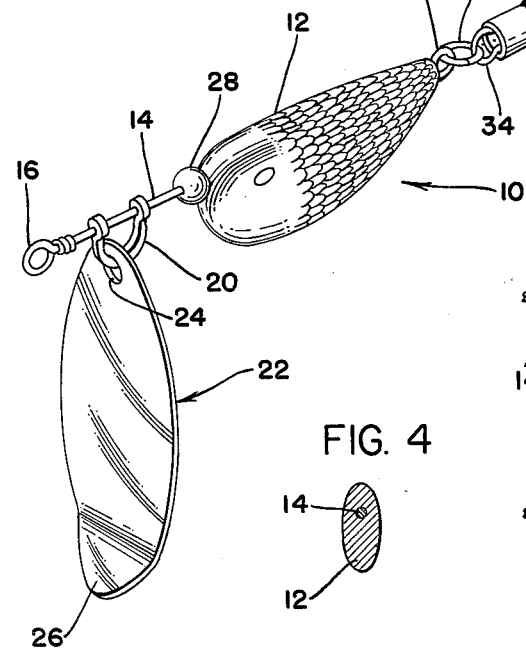

United States Patent Office 3,104,486
Patented Sept. 24, 1963

3,104,486
FISH LURE
William M. Gressard, 759 Ravenna Road, Kent, Ohio
Filed July 1, 1960, Ser. No. 40,329
7 Claims. (Cl. 43—42.17)

This invention relates to fish lures and particularly to that type which includes a body member simulating that of a fish or other species of water life, with a spinner rotatably mounted adjacent the leading end of the body.

The use of rotatable spinners either alone or in combination with bodies of various descriptions and/or skirts or bucktails constructed of feathers, fibers or the like is well known, and over the years a large number of lures embodying one or more of these components has been widely distributed among fishermen. Some such lures have proved quite successful in actual use, while others have left something to be desired.

This invention contemplates the use of various newly conceived constructional features so interrelated as to provide a lure for such liveliness and action as to define fish-catching characteristics quite superior to those of the majority of lures of the class described. More particularly, the invention envisages broadly the utilization of a spinner and a body member so designed that the rotation of the spinner imparts to the body member an oscillating motion akin to a jumping or jerking action. In general terms, this is accomplished by employing a spinner which rotates in a cone intersected at one or more points by the body member, so that the spinner as it rotates will intermittently strike the body and displace the same angularly or laterally.

It is an object of the invention to provide a fish lure of the type including a rotatable spinner and a body member and having a lively action not heretofore obtainable in fish lures of similar type.

It is a more particular object of the invention to provide a fish lure of the type described employing a rotatable spinner for intermittently striking against the body member to displace the same.

It is a further object of the invention to provide a fish lure which includes a body member having attached to the trailing end thereof a skirt-like member or bucktail, and having mounted adjacent the leading end thereof a rotatable spinner for intermittent abutment with the body in order to produce lateral and/or angular deflections both of the body and of the skirt-like member.

It is a further object of the invention to provide a fish lure of the type described which includes a spinner rotatable in a cone intersected by the body, which imparts to the body, by striking, a lively action attractive to fish.

Other and further objects of the invention will be apparent from the detailed description to follow.

In the drawings:

FIG. 1 is a perspective view of a fish lure embodying the principles of the invention;

FIG. 2 is a fragmentary top view of the body portion of the lure as shown in FIG. 1;

FIG. 3 is a fragmentary side elevation of the body member shown in FIG. 2;

FIG. 4 is a cross-sectional view of the body taken along line 44 of FIG. 3;

FIG. 5 is a series, in reduced scale, of side elevational views, some in phantom, of the lure of FIG. 1 and showing the same in various progressive stages of its movement; and FIG. 6 is a fragmentary view, partly in section, of the skirt connection to the eye of the hook with only a single strand of the skirt shown for sake of clarity.

Referring now more particularly to the drawings, a fishing lure indicated generally at 10, is illustrated in FIG. 1 as including an elongated bulbous body 12 simulating a fish or other underwater creature. The body 12 may be constructed of any suitable material, such as lead alloy or the like. An elongated mounting shaft 14 extends through the body with portions thereof extending beyond the body at both ends. As will be observed from an examination of the drawings, the body member is offset with regards to the mounting shaft 14 so that the locus of the center of gravity of the body lies below the mounting shaft to prevent rotation of the body as the lure is pulled through the water.

Loops 16 and 18 are formed at the leading and trailing ends respectively of the mounting shaft 14 for purposes to be described hereinafter. A clevis 20 is rotatably mounted on the shaft 14 adjacent the leading end of the bulbous body member 12. A generally oval spinner 22 is provided with an aperture 24 through which the clevis 20 is received. The free end of the spinner 22 is bent to provide a portion 26 angularly offset in a direction away from the body member 12. A bead 28 of plastic or the like is positioned on the shaft 14 between the clevis 20 and the body member 12, and acts as a bearing to prevent undue interference of the body 12 with the rotational movements of the clevis and spinner.

A skirt-like member or bucktail indicated generally at 30, includes a conventional treble hook 32 provided at the end of the shank thereof with an eye 34. The skirt-like member or bucktail 30 is mounted for a wiggling movement by means of a split ring 36 extending through the eye 34 and the loop 18.

The skirt-like member 30 is illustrated as including a large group 38 of hair-like fibers or the like, although these could, if desired, be replaced by feathers or omitted entirely. As seen in FIGS. 1 and 6 each fiber of the group 38 is looped through the eye 34 of the treble hook 32, and the entire group of such fibers is subsequently clamped to the shank of the hook by means of wrapped thread (not shown). In order to maintain the fibers 38 spread so that they may at all times have an unmatted, fluffy appearance, a pair of tubes 40 and 42 are employed which may be constructed, if desired, from relatively pliable plastic or the like. The tube 40 is somewhat shorter, but larger in diameter than the tube 42, and is disposed around the group 38 of fibers and the shank of the treble hook 32 adjacent the eye 34. The tube 42 is also received on the shank of the hook but is disposed between the shank and the fibers making up the group 38, and extends at least partially into the tube 40. In this manner the fibers making up the group 38 are clamped securely between the tubes 40 and 42 in a flared or spread disposition and matting is thereby prevented.

The operation of a lure embodying the novel features of this invention will be more easily understood from reference to FIG. 5 of the drawing. When the lure is pulled through the water by means of line 44 attached through loop 16, the spinner 22 is caused to rotate in a cone generally coaxial with the shaft 14. The angle defined between the offset portion 26 of the spinner 22 and the remainder thereof is largely responsible for the magnitude of the angle subtended by the cone in which the spinner rotates. Within limits, the more abrupt the angle of offset, the smaller the magnitude of the subtended angle defined by the cone within which the spinner rotates.

The abruptness of the angle of offset may be adjusted so that the cone of revolution intersects or is intersected by a portion of the body 12 in order that the spinner may strike against the same as it revolves. Obviously, the magnitude of the angle of offset will vary depending upon the length of the spinner, the size of the body, the spacing of the clevis from the leading end of the body, and the spacing between the radially inner edge of the spinner and the shaft.

A collision between the body 12 and the rotating spinner causes the body to be deflected upwardly as seen first in the right hand phantom view of FIG. 5. Shortly after the collision, the body 12, under the influence of the tension in the line 44, returns to a more or less horizontal position as seen in the next proceeding phantom view. Upon continued rotation the spinner once again strikes the body to deflect it upwardly as seen in the solid line view of FIG. 5. In effect, the rotation of the spinner through several cycles imparts an oscillatory motion to the body 12 which in turn imparts a similar oscillatory motion to the skirt-like member or bucktail 30 as seen in the solid line view of FIG. 5. This liveliness of action has been found by experiment to be extremely effective in attracting fish.

For ease of description, I have illustrated the principles of the invention as being included in but a single embodiment. It will be immediately apparent to those skilled in the art, however, that a number of modifications could be made to the illustrated embodiment without, at the same time, departing from the true spirit of the invention. It is therefore my desire to be limited only by the scope of the appended claims.

I claim:

1. A fish lure including a mounting shaft, a bulbous body member mounted on the shaft in laterally offset relationship with respect thereto, a clevis rotatably mounted on the shaft adjacent the leading end of the bulbous body member, a spinner blade loosely mounted on said clevis, and means causing the spinner blade, when the lure is moved through the water at cruising speed, to rotate in a cone intersecting at least a portion of the bulbous body member, whereby the spinner blade, as it rotates, strikes against the bulbous body member imparting a jumping action thereto.

2. A fish lure as defined in claim 1 characterized by the provision of a skirt-like member pivotally mounted adjacent the trailing end of the bulbous body member.

3. A fish lure including a body member having a shaft at the forward end thereof, a skirt-like member mounted for wiggling movement adjacent the trailing end of the body member, hook means mounted on said trailing end of said body, a clevis rotatably mounted on the shaft adjacent the leading end of the body member, a spinner blade loosely mounted on said clevis, and means for causing the spinner, as it rotates, to strike against the body member imparting thereby a lively action to the lure as it is pulled through the water.

4. A fish lure as defined in claim 3 in which said means includes a portion provided on the spinner offset in the direction away from the body member.

5. A fish lure as defined in claim 3 in which the skirt member is comprised of a plurality of hair-like fibers looped through the eye of a hook, a pair of concentric tubes clampingly receiving said hair-like fibers therebetween, one fitted within the other, and both tubes being positioned around the shank of the hook.

6. A fish lure comprising a bulbous body member, shaft means at the forward end of said body, said shaft being positioned in said body, said body being laterally offset with respect thereto, thereby to have a first portion of the body spaced further from said shaft than a diametrically opposed second portion, a clevis rotatably mounted on said shaft, a spinner blade loosely mounted on said clevis so that when said lure is moved through the water the spinner blade rotates in a conical pattern with respect to said shaft and at least a portion of said conical pattern intersectiong said first portion to impart a deflection to said body.

7. A fish lure as defined in claim 6, in which a skirt-like member is mounted on said shaft adjacent said body.

References Cited in the file of this patent

UNITED STATES PATENTS

| | | |
|---|---|---|
| 716,451 | Mantz | Dec. 23, 1902 |
| 2,036,954 | Murray | Apr. 7, 1936 |
| 2,223,475 | Withey | Dec. 3, 1940 |
| 2,835,999 | Gillilan | May 27, 1958 |
| 2,902,791 | Woodley | Sept. 8, 1959 |
| 3,000,130 | Pankuch | Sept. 19, 1961 |

FOREIGN PATENTS

| | | |
|---|---|---|
| 1,033,811 | France | Apr. 8, 1953 |